United States Patent [19]

Daly et al.

[11] Patent Number: 4,945,878
[45] Date of Patent: Aug. 7, 1990

[54] EXTENDED OVER TEMPERATURE OPERATION AND CONTROLS FOR IC ENGINE

[75] Inventors: Paul D. Daly, Troy; Peter E. Luchinski, Sterling Heights, both of Mich.

[73] Assignee: Siemens-Bendix Automotive Electronics L.P., Troy, Mich.

[21] Appl. No.: 367,273

[22] Filed: Jun. 16, 1989

[51] Int. Cl.$^5$ .......................... F02D 41/26; F01P 5/14
[52] U.S. Cl. .................... 123/478; 123/41.15
[58] Field of Search ............... 123/478, 480, 41.15, 123/41.13

[56] References Cited

U.S. PATENT DOCUMENTS

| | | | |
|---|---|---|---|
| 4,615,316 | 10/1986 | Yasuhara | 123/41.15 |
| 4,641,618 | 2/1987 | Dogadko et al. | 123/41.15 |
| 4,656,973 | 4/1987 | Endres | 123/41.15 |
| 4,662,316 | 5/1987 | Kubozuka | 123/41.15 |
| 4,785,784 | 11/1988 | Nanyoshi et al. | 123/478 |
| 4,794,897 | 1/1989 | Kinouchi | 123/41.15 |
| 4,804,139 | 2/1989 | Bier | 123/41.15 |
| 4,836,164 | 6/1989 | Morozumi et al. | 123/478 |

*Primary Examiner*—Raymond A. Nelli
*Attorney, Agent, or Firm*—George L. Boller; Russel C. Wells

[57] ABSTRACT

In the event of coolant loss leading to engine overheating, the operating range of an automobile engine can be extended by limiting the engine load signal that is supplied to the engine E.C.U. A circuit for implementing this feature is disclosed.

6 Claims, 2 Drawing Sheets

EXTENDED OVER TEMPERATURE OPERATION AND CONTROLS FOR IC ENGINE

BACKGROUND AND SUMMARY OF THE INVENTION

This invention relates to the operation and control of internal combustion engines. Specifically it relates to operation and controls for extending over temperature running of an engine.

In order to provide adequate heat rejection for the full operating range of an internal combustion engine of an automotive vehicle, such engines are equipped with cooling systems in which a liquid coolant is circulated through coolant passages in the engine to absorb heat and then through a radiator to reject heat. For any of a number of different reasons, it is possible that coolant may be lost from the cooling system and if a sufficient amount of coolant loss occurs, then the engine will begin to overheat. Such overheating gives rise to a greater amount of friction within the engine so that a greater throttle opening is required to maintain a given engine speed. This will result in an even greater quantity of heat being generated within the engine and a more rapid rise in the temperature of the engine and associated components. Therefore, if speed is maintained the engine will eventually reach a temperature at which it will cease to operate due to seizure of the engine mechanism such as piston seizure, crankshaft seizure or camshaft seizure. By the time the engine ceases running, many components will have reached extremely high temperatures and may be irreversibly damaged. However, in some cases it will be possible to restart the engine after cooling off, and it will be possible to run the engine at a reduced level of performance, although this can be hazardous since an unknown amount of damage has likely been done leading to uncontrolled engine operating conditions.

In general, the vehicle will be capable of traveling a certain amount of distance, say X miles, from the point of initial coolant loss until the engine ceases to operate. The use of new materials for certain engine components, such as a plastic intake manifold, for example, may result in the inability of such parts to withstand the increased temperatures that would occur in an all metal engine that is run until the engine ceases. Accordingly, a vehicle that has an engine equipped with such a nonmetallic component will likely be incapable of operating the X miles distance referred to above, from the time of initial coolant loss. This reduction in operating range would be unwelcome and attributable directly to the plastic component.

The present invention relates to a novel engine control philosophy that addresses the loss of engine coolant in an engine containing a major plastic component, such as an intake manifold, so that an unwelcome reduction in the operating range of the vehicle after initial coolant loss is avoided. Another aspect of the invention relates to an electronic control circuit for implementing this novel control philosophy.

The invention arises through the recognition of the fact that a reduction in the engine load will result in the engine producing less heat, and therefore being capable of operating longer, when overheating is detected. The manner in which the load is reduced is a unique aspect of the invention and involves the attenuation of an engine load signal to the engine electronic control unit (ECU) when overheating is sensed.

An engine ECU controls engine operation in accordance with different inputs to the ECU. One of these inputs is a signal representative of engine load. A common way to measure engine load is by means of a manifold absolute pressure (MAP) sensor. The MAP sensor provides an output voltage corresponding approximately linearly to the engine load with higher voltage typically representing higher engine load. When an over temperature condition is detected, the MAP sensor output voltage is deliberately limited thereby resulting in the ECU receiving an engine load signal that at least at times is lower than the actual MAP sensor (engine load) signal. Accordingly, the load that is seen by the ECU appears less than it actually is and the ECU will, therefore, act to produce less engine power. As a result, heat is generated at a lower rate enabling the engine to run for a longer period of time before the temperature rises to a critical level. In this way, the operating range of an engine that has a major plastic component, such as the intake manifold, is not reduced from the operating range that it would have if all metal construction were used. The invention, therefore, provides a reduction or elimination of the destructive effects of coolant loss and the dangerous operation of a damaged engine may be avoided. The use of a MAP sensor is preferred over other load sensors, such as airflow sensors, since the MAP sensor will result in a leaning of the air fuel ratio which will cause a reduction in cylinder temperatures and an excess of cooling air to be introduced into the engine. It will also provide obvious driving symptoms to the driver of the vehicle that something is wrong with the engine before a sudden unsignaled cessation of engine operation occurs.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time for carrying out the invention.

DESCRIPTION OF THE PREFERRED EMBODIMENT

Figure 1:
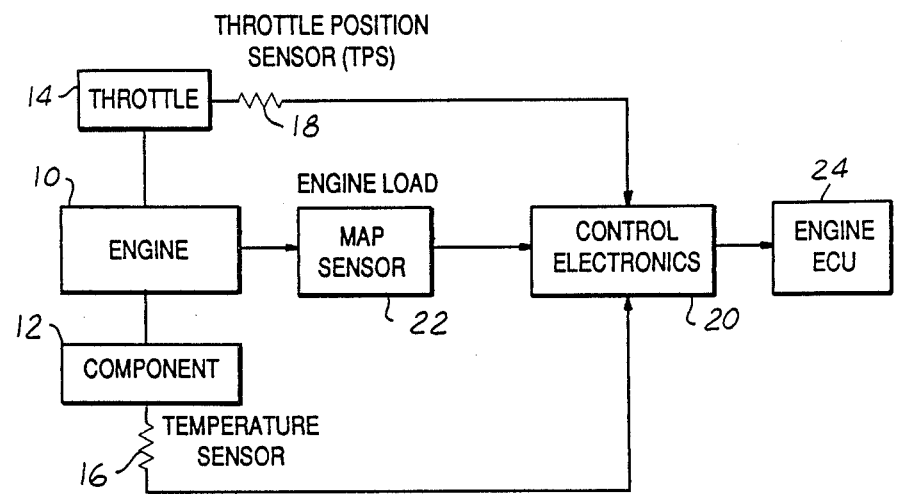
FIG. 1 is a schematic block diagram of an engine control system embodying the present invention.

In FIG. 1 an internal combustion engine 10 of an automobile comprises a major component 12 which may, for example, be a plastic intake manifold, and it also has a throttle 14 that is a part of a throttle mechanism that is controlled by the vehicle operator. A temperature sensor such as a thermistor 16 is associated with component 12 for measuring the component's temperature. A throttle position sensor (TPS) 18 is associated with the throttle mechanism for indicating the degree of opening of the throttle. The TPS 18 and thermistor 16 provide input signals to an over temperature control electronics designated by the numeral 20. The load on engine 10 is measured by a MAP sensor 22 which also supplies an input to over temperature control electronics 20. The output from over temperature control electronics 20 is in turn supplied to the engine electronic control unit (ECU) 24.

Figure 2:
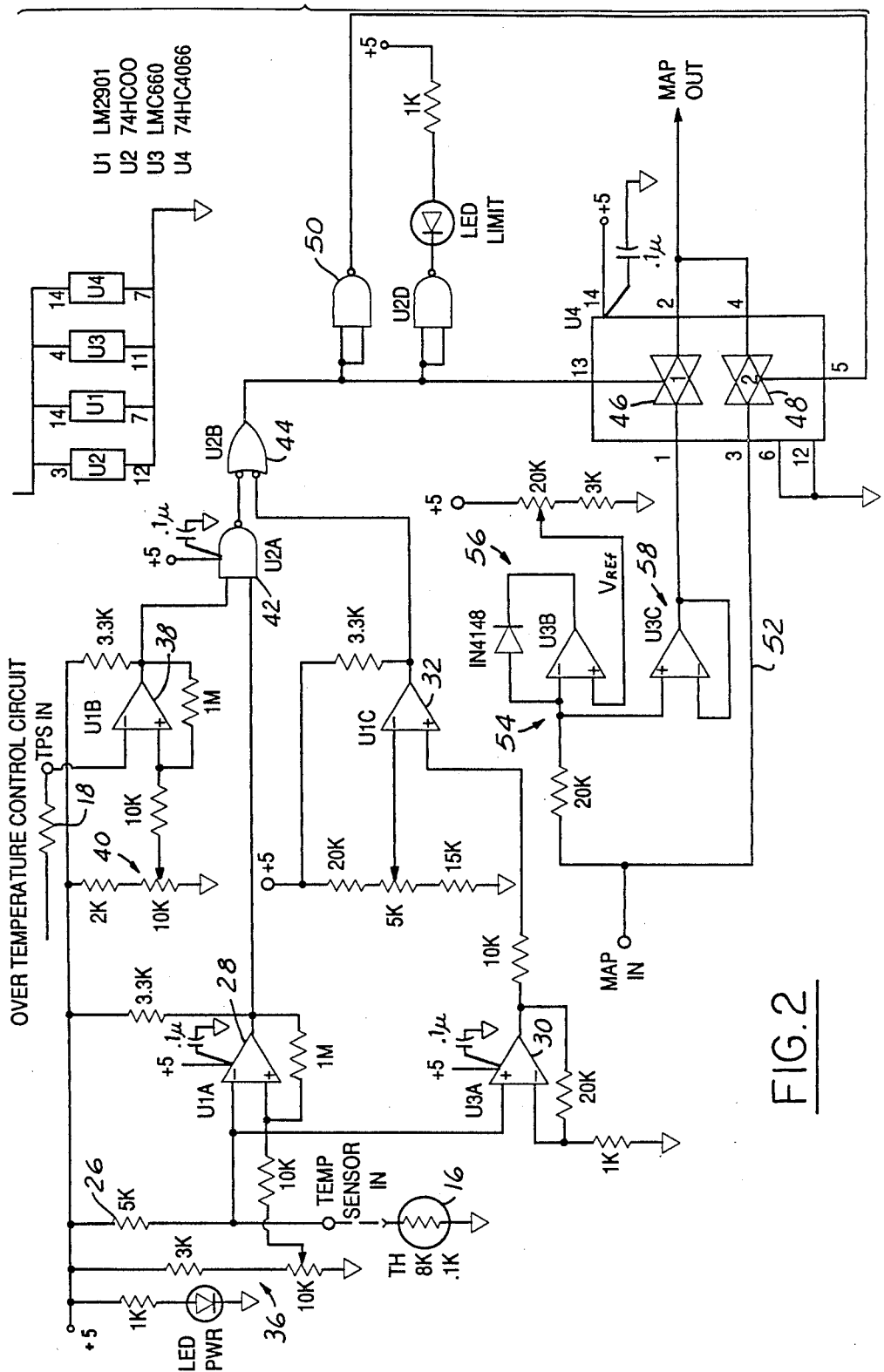
FIG. 2 is a detailed electrical schematic diagram of the over temperature control circuit that is used in the block diagram of FIG. 1.

FIG. 2 is detailed electronic schematic diagram of the over temperature control electronics 20. Temperature sensor thermistor 16 is connected in a series circuit with a resistor 26 across the five volt power supply that serves the control electronics. The junction of thermistor 16 and resistor 26 connects to the inverting input of a comparator circuit 28 and to the non-inverting input of another comparator circuit 30 that is configured to function as an amplifier. The amplified signal from circuit 30 is supplied to the non-inverting input of a comparator 32.

The inverting input of comparator 32 is connected to a voltage divider circuit 34 that enables a selectable fraction of the five volt power supply voltage to be applied to the inverting input of comparator 32. With this arrangement, the output from comparator 32 will command load limiting when the temperature sensed by thermistor 16 rises above a selected set point, for example, 260° F.

The non-inverting input of comparator 28 is connected to a voltage divider circuit 36 that can be set to provide a selectable reference to the non-inverting input of comparator 28. When the temperature sensed by thermistor 16 exceeds a selected set point, in the vicinity of 34° F., for example, the output of comparator 28 commands load limiting. The load limiting that is commanded by comparator 28 will not be effective, however, unless the throttle position sensor 18 is also simultaneously in a position indicating that the throttle is in an idle or near closed condition. A determination of throttle position as sensed by TPS 18 is provided by a comparator circuit 38. The throttle position sensor is connected to the inverting input of comparator 38 while the non-inverting input of the comparator is connected to a selectable reference value 40 corresponding to near closed or idle throttle position. When the throttle position is in a near closed or idle position, the output from comparator 38 provides a signal of this indication to the input of a logic gate 42. The other input of logic gate 42 receives the output of comparator 28. Logic gate 42 functions to provide an output signal that will command load limiting only if the throttle position is in the near closed or idle position and the temperature sensed by thermistor 16 is above the lower set point.

The output of logic gate 42 and the output of comparator circuit 32 are inputs to another logic gate 44. Logic gate 44 will produce an output signal commanding load limiting if either the thermistor temperature is above the high set point or gate 42 is commanding limiting. The output of gate 44 controls the conductivity of two analog switches 46, 48. The two switches are operated in a mutually exclusive manner such that when one switch is on, the other is off, and vice versa. The control input of switch 46 connects directly to the output of gate 44 while the control input of switch 48 connects to the output of gate 44 via an inverter circuit 50.

Switches 46 and 48 control the delivery of the MAP sensor output to the engine ECU. The MAP sensor is connected to the engine ECU through a branch circuit 52 that contains switch 48, so that when switch 48 is conducting, the full value of the MAP sensor signal is delivered to the engine ECU. A second branch circuit 54 also connects the MAP sensor to the engine ECU. Branch 54 contains a voltage limiter circuit 56 and a voltage follower 58. The voltage limiter circuit 56 is responsive to the magnitude of the MAP sensor voltage and functions in the following manner. For MAP voltages that are less than a selected reference value of engine load, as set by limiter 56, the full value of the MAP signal can be transmitted through follower 58. However, for values of MAP signal exceeding the reference setting of limiter 56, the value of the MAP signal that can be passed through follower 58 is limited to the set value.

With this organization and arrangement, the full value of the MAP signal is passed to the engine ECU whenever the sensed temperature is below the first set point. When the temperature is between the first set point and the second set point, the full value of the MAP sensor signal is transmitted to the engine ECU so long as the throttle position sensor does not indicate a closed or near idle condition. When the sensed temperature is an abnormally high one, meaning one that is beyond the second set point, the full value of the MAP sensor signal is passed to the engine ECU only for values of MAP sensor signal that are below the limit set by limiter 56 and if the MAP signal is above this limit then the value of MAP signal that is supplied to the engine ECU is at a limited value. When overheating of an engine component is sensed, the load signal delivered to the engine ECU is limited and therefore the engine will generate heat at a slower rate than it otherwise would and this extends the operating time of the engine beyond that which would otherwise occur in the overheated condition.

While a preferred embodiment of the invention has been described, it is to be understood the principles are applicable to other embodiments. For example, it is contemplated that the over temperature control electronics can be embodied in a microprocessor type control directly rather than having a separate discrete circuit between the MAP sensor and the engine ECU.

We claim:

1. In an automotive vehicle that is powered by an I.C. engine whose operation is controlled by an engine E.C.U. according to different inputs to the E.C.U., one of said inputs being an engine load signal, and the E.C.U. causing the engine to produce greater power as the engine load signal increases, the improvement which comprises:

temperature sensing means for distinguishing between a range of normal engine operating temperatures and an abnormally high temperature indicative of engine overheating; and control means, effective during sensing of an abnormally high temperature by said temperature sensing means, for causing 100% of the value of said engine load signal to be acted upon by the engine E.C.U. for only certain values of said engine load signal and causing less than 100% of the value of said engine load signal to be acted upon by the engine E.C.U. for other values of said load signal.

2. The improvement set forth in claim 1 wherein said control means comprises means for causing 100% of the value of said engine load signal to be acted upon by the E.C.U. for values of engine load below a certain load and causing less than the full value of said engine load signal to be acted upon by the E.C.U. for values of engine load above said certain load.

3. The improvement set forth in claim 2 wherein said control means comprises means for causing a substantially constant value of the engine load signal to be acted upon by the E.C.U. for values of engine load above said certain load.

4. The improvement set forth in claim 1 in which the engine has a throttle mechanism that operates between closed and open positions to control the amount of air entering the engine for combustion, and a throttle position sensor that senses the position of said throttle mechanism, and in which said control means comprises means effective within a certain range of normal engine temperatures for causing less than 100% of the value of said engine load signal to be acted upon by the engine E.C.U. if the throttle mechanism is in a near closed or idle position and the engine load signal is above a selected value.

5. The improvement set forth in claim 1 wherein said control means comprises an input terminal at which the engine load signal is received, a first channel containing a first controlled conduction switch and a second channel containing a second controlled conduction switch, said first channel serving to pass the engine load signal substantially unaltered, said second channel serving to pass the engine load signal to the E.C.U. substantially unaltered for values of the load signal less than a predetermined value and for clamping the engine load signal to said predetermined value for values of the load signal greater than said predetermined value, and means for mutually exclusively operating said first and second switches.

6. The improvement set forth in claim 5 wherein the switches are controlled by the output of a logic gate having a pair of inputs connected to respective input circuits; and one of said input circuits comprising circuitry for distinguishing between normal temperature and over temperature, the other input circuit comprising circuitry for distinguishing between open and closed throttle when the engine is operating in normal temperature range.

* * * * *